(12) United States Patent
Carson et al.

(10) Patent No.: US 10,771,240 B2
(45) Date of Patent: Sep. 8, 2020

(54) DYNAMIC BLOCKCHAIN SYSTEM AND METHOD FOR PROVIDING EFFICIENT AND SECURE DISTRIBUTED DATA ACCESS, DATA STORAGE AND DATA TRANSPORT

(71) Applicant: Dynamic Blockchains Inc, Riverside, CT (US)

(72) Inventors: James A. Carson, Riverside, CT (US); Ryuta Richard Makino, Greenwich, CT (US); Susan H. Glenn-Joseph, Rye Brook, NY (US)

(73) Assignee: Dynamic Blockchains Inc, Riverside, CT (US)

( * ) Notice: Subject to any disclaimer, the term of this patent is extended or adjusted under 35 U.S.C. 154(b) by 0 days.

(21) Appl. No.: 16/438,188

(22) Filed: Jun. 11, 2019

(65) Prior Publication Data
US 2019/0386817 A1    Dec. 19, 2019

Related U.S. Application Data

(60) Provisional application No. 62/684,553, filed on Jun. 13, 2018.

(51) Int. Cl.
*H04L 9/06* (2006.01)
*G06F 21/60* (2013.01)
(Continued)

(52) U.S. Cl.
CPC .......... *H04L 9/0637* (2013.01); *G06F 21/602* (2013.01); *G06F 21/64* (2013.01);
(Continued)

(58) Field of Classification Search
None
See application file for complete search history.

(56) References Cited

U.S. PATENT DOCUMENTS 10,135,607 B1   11/2018   Roets
10,158,479 B2   12/2018   Chapman et al.
(Continued)

OTHER PUBLICATIONS

Stefanov et al.; Iris: A Scalable Cloud File System with Efficient Integrity Checks; 2012; Retrieved from the Internet: https://eprint.iacr.org/2011/585.pdf; pp. 1-33, as printed. (Year: 2012).*
(Continued)

*Primary Examiner* — Saleh Najjar
*Assistant Examiner* — Michael W Chao
(74) *Attorney, Agent, or Firm* — Olav M. Underdal; IDP Patent Services

(57) ABSTRACT

A dynamic blockchain system includes: at least one complete asset node server, including a complete asset manager and a complete asset storage; a plurality of hash asset node servers, each including a hash asset manager and an asset blockchain and; a dynamic blockchain management server, including a blockchain manager, a representation calculation function, and an asset map with a plurality of map records; and a blockchain management device; such that the dynamic blockchain management server validates a digital asset by lookup in the at least one complete asset node server and by verification of the digital asset by a random sampling in a statistically representative number of hash asset node servers in the plurality of hash asset node servers.

20 Claims, 12 Drawing Sheets

(51) Int. Cl.
H04L 9/32 (2006.01)
G06F 21/64 (2013.01)

(52) U.S. Cl.
CPC .......... H04L 9/0643 (2013.01); H04L 9/3218 (2013.01); *H04L 2209/38* (2013.01)

(56) References Cited

U.S. PATENT DOCUMENTS

| | | | |
|---|---|---|---|
| 10,171,476 B2 | 1/2019 | Khan | |
| 10,198,311 B1 | 2/2019 | Donlan et al. | |
| 10,200,198 B2 | 2/2019 | Ganesan et al. | |
| 10,225,273 B2 | 3/2019 | Li et al. | |
| 10,242,219 B2 | 3/2019 | Struttmann | |
| 10,248,793 B1 | 4/2019 | Kirschner | |
| 10,255,342 B2* | 4/2019 | Madisetti | G06Q 20/0658 |
| 10,262,127 B2 | 4/2019 | Subramaniyan et al. | |
| 10,262,153 B2 | 4/2019 | Ford et al. | |
| 10,263,785 B1 | 4/2019 | Waters et al. | |
| 10,269,012 B2 | 4/2019 | Miller et al. | |
| 10,275,176 B1 | 4/2019 | Gold et al. | |
| 10,275,285 B1 | 4/2019 | Gold et al. | |
| 10,277,561 B2 | 4/2019 | Cox et al. | |
| 10,282,558 B2 | 5/2019 | Chan et al. | |
| 10,284,568 B2 | 5/2019 | Day et al. | |
| 10,296,258 B1 | 5/2019 | Richardson | |
| 10,296,764 B1* | 5/2019 | Batishchev | H04L 63/00 |
| 10,298,571 B2 | 5/2019 | Andrade | |
| 10,303,887 B2 | 5/2019 | Black et al. | |
| 10,305,694 B2 | 5/2019 | Dix et al. | |
| 10,305,875 B1 | 5/2019 | Ateniese et al. | |
| 10,320,843 B1* | 6/2019 | Dobrek | H04L 9/3239 |
| 10,601,911 B2* | 3/2020 | Duan | G06F 21/62 |
| 10,614,239 B2* | 4/2020 | Jacques de Kadt | G06F 21/6227 |
| 10,623,386 B1* | 4/2020 | Bernat | H04L 9/085 |
| 10,628,389 B2* | 4/2020 | Bordens | G06F 3/0607 |
| 10,630,485 B2* | 4/2020 | Zinder | H04L 9/3247 |
| 2005/0108378 A1 | 5/2005 | Patterson et al. | |
| 2016/0260169 A1 | 9/2016 | Arnold et al. | |
| 2016/0292396 A1* | 10/2016 | Akerwall | G06F 21/645 |
| 2016/0335609 A1* | 11/2016 | Jenkins | G06Q 20/1235 |
| 2017/0031676 A1 | 2/2017 | Cecchetti et al. | |
| 2017/0116693 A1* | 4/2017 | Rae | G06Q 20/3827 |
| 2017/0206523 A1* | 7/2017 | Goeringer | G06F 21/45 |
| 2017/0228371 A1* | 8/2017 | Seger, II | G06F 16/215 |
| 2017/0237570 A1* | 8/2017 | Vandervort | H04L 63/0442 713/176 |
| 2017/0331635 A1* | 11/2017 | Barinov | H04L 9/3226 |
| 2018/0089256 A1* | 3/2018 | Wright, Sr. | G06Q 20/1235 |
| 2018/0089436 A1* | 3/2018 | Smith | H04L 9/3236 |
| 2018/0109541 A1* | 4/2018 | Gleichauf | H04W 12/10 |
| 2018/0131765 A1 | 5/2018 | Puleston et al. | |
| 2018/0248701 A1* | 8/2018 | Johnson | H04L 9/3247 |
| 2018/0260888 A1* | 9/2018 | Paolini-Subramanya | G06Q 40/025 |
| 2018/0285983 A1* | 10/2018 | Franaszek | G06Q 40/12 |
| 2018/0287780 A1* | 10/2018 | Safford | G06F 21/577 |
| 2018/0300694 A1* | 10/2018 | Duan | G06Q 20/065 |
| 2018/0337769 A1* | 11/2018 | Gleichauf | G06Q 20/29 |
| 2019/0012466 A1* | 1/2019 | Ricotta | H04L 67/10 |
| 2019/0123892 A1* | 4/2019 | Basu | H04L 9/0643 |
| 2019/0220324 A1* | 7/2019 | Carver | G06F 9/5072 |
| 2019/0280872 A1* | 9/2019 | Falk | G06F 21/64 |
| 2019/0303622 A1* | 10/2019 | Versteeg | H04L 9/3239 |
| 2019/0334716 A1* | 10/2019 | Kocsis | H04L 63/0442 |
| 2019/0354518 A1* | 11/2019 | Zochowski | G06F 16/2379 |
| 2019/0379797 A1* | 12/2019 | Sahagun | H04L 67/1097 |
| 2020/0082061 A1* | 3/2020 | Goldston | G06F 16/686 |
| 2020/0099534 A1* | 3/2020 | Lowagie | H04L 9/0643 |
| 2020/0120221 A1* | 4/2020 | Sahagun | H04N 1/00411 |
| 2020/0125747 A1* | 4/2020 | Hamel | H04L 9/3236 |

OTHER PUBLICATIONS

Yu et al.; Decentralized Big Data Auditing for Smart City Environments Leveraging Blockchain Technology; Jan. 2019; Retrieved from the Internet: https://ieeexplore.ieee.org/abstract/document/8584425; pp. 1-9, as printed. (Year: 2019).*

Kokoris-Kogias et al.; OmniLedger: A Secure, Scale-Out, Decentralized Ledger via Sharding; May 2018; Retrieved from the Internet: https://ieeexplore.ieee.org/abstract/document/8418625; pp. 1-16, as printed. (Year: 2018).*

* cited by examiner

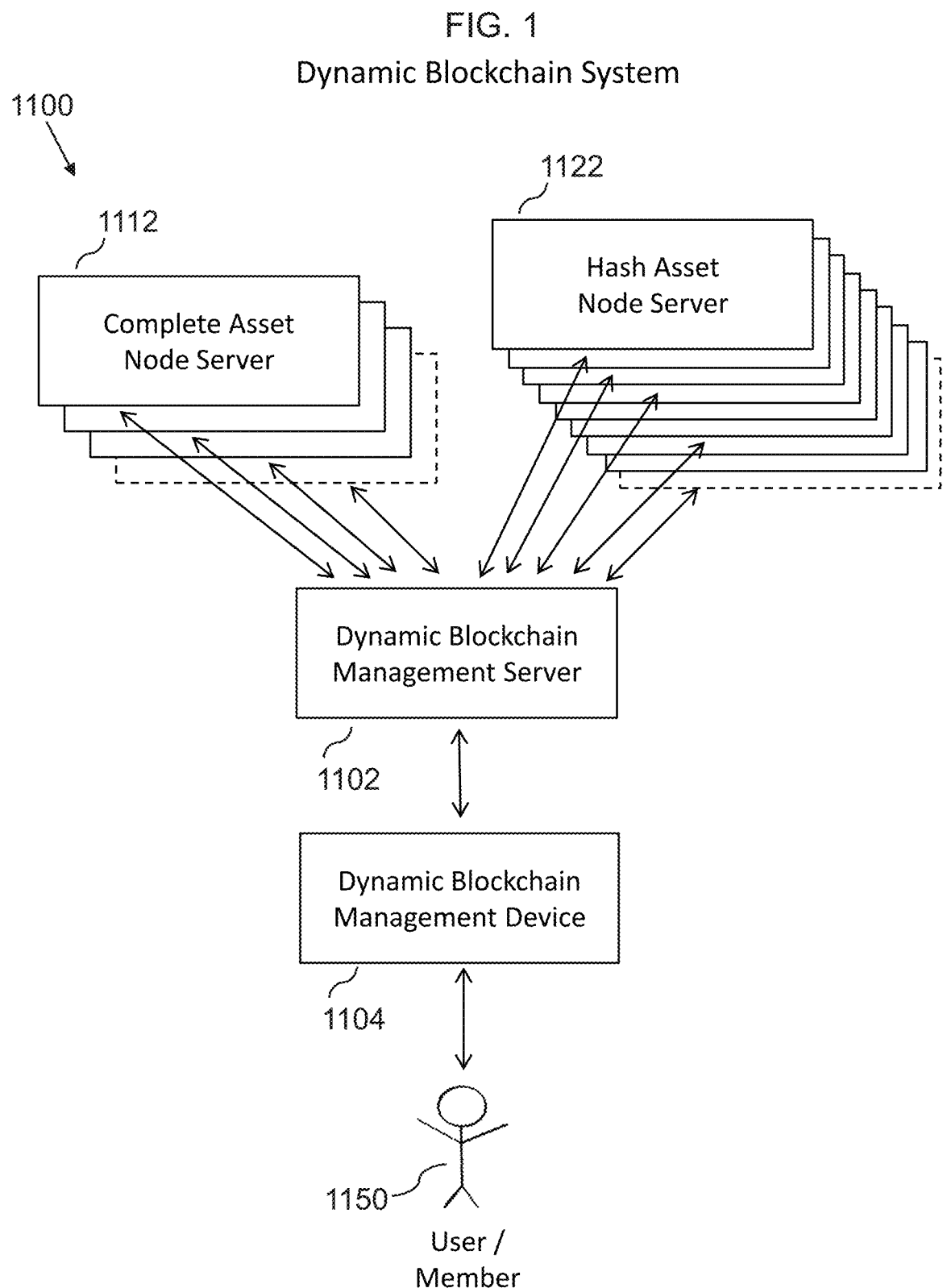

Complete Asset Node Server

Complete Asset Storage

Hash Asset Node Server

Asset Blockchain

Asset Block

Dynamic Blockchain Management Server

Asset Map

Dynamic Blockchain Management Device

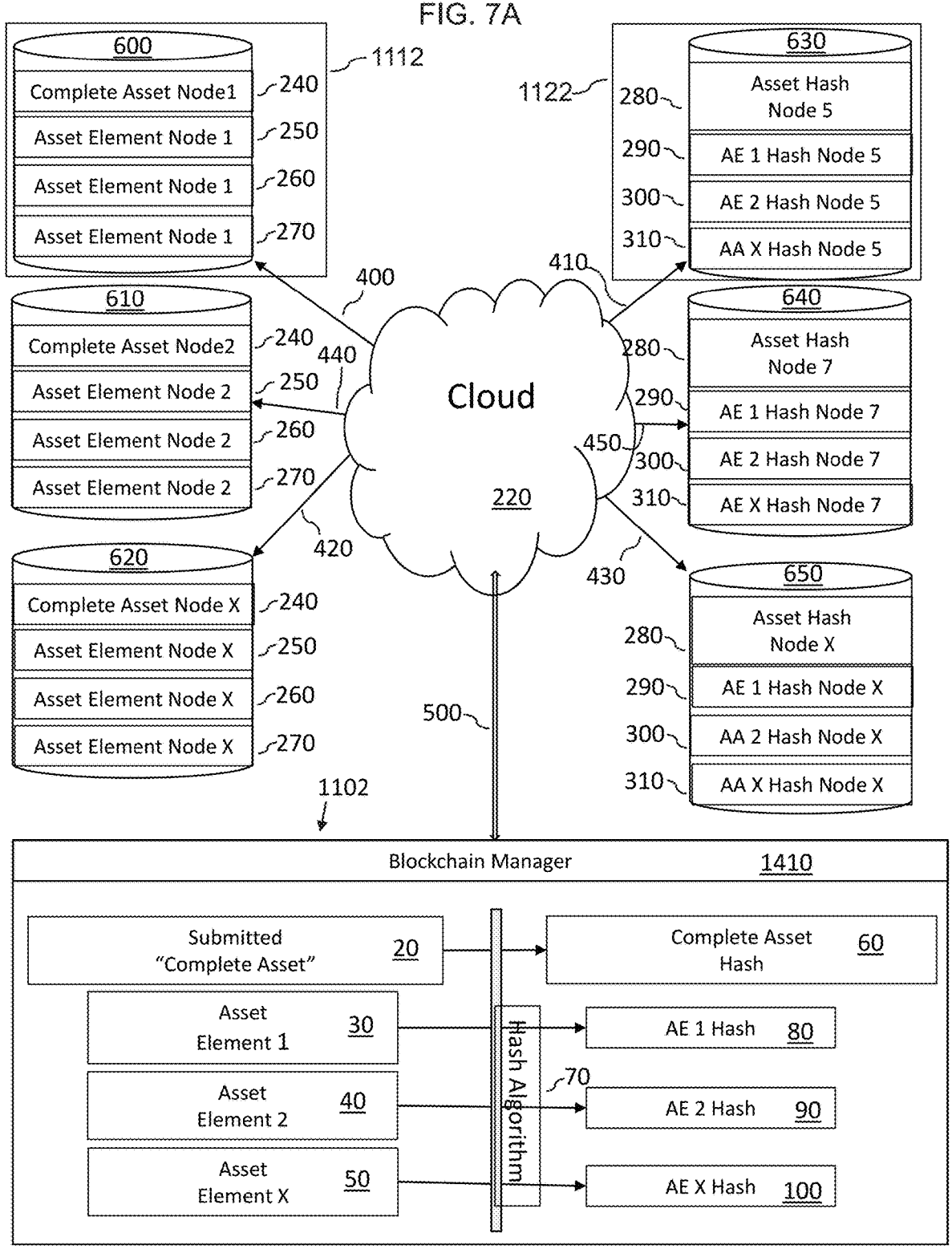

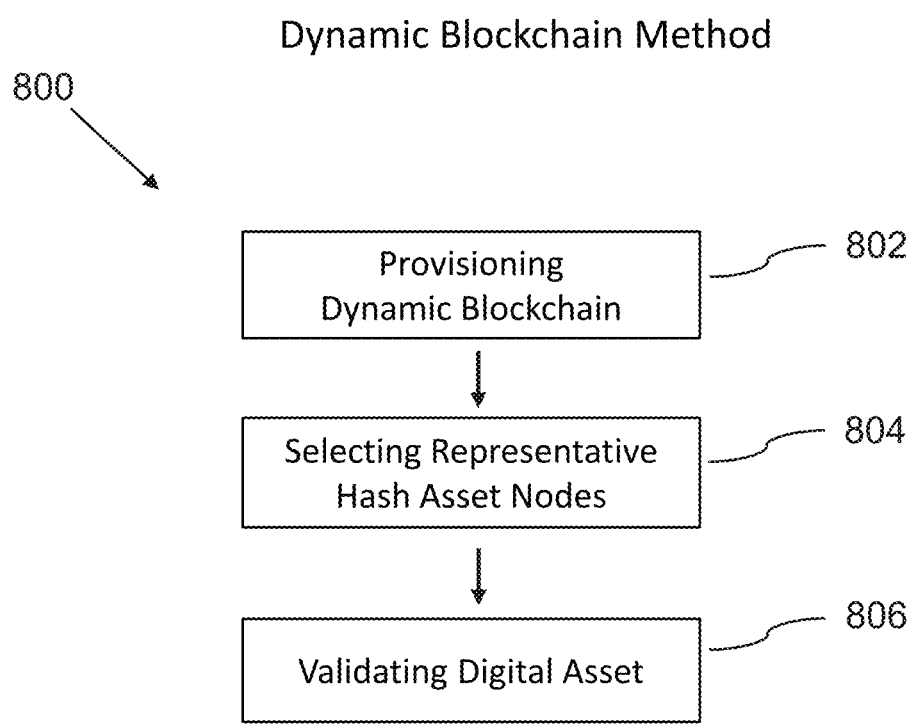

DYNAMIC BLOCKCHAIN SYSTEM AND METHOD FOR PROVIDING EFFICIENT AND SECURE DISTRIBUTED DATA ACCESS, DATA STORAGE AND DATA TRANSPORT

CROSS-REFERENCE TO RELATED APPLICATIONS

This application claims the benefit of U.S. Provisional Application No. 62/684,553, filed Jun. 13, 2018; which is hereby incorporated herein by reference in its entirety.

FIELD OF THE INVENTION

The present invention relates generally to systems, methods, and procedures used to create a dynamic distributed data structure that protects the security of data and the privacy of individuals at the point of access, during transmission across networks, and while stored at single or multiple points across network(s). More particularly the present invention is within the generally understood concepts of Blockchain where the present invention utilizes a system of dynamic storage, multiple storage states, tiered security that is definable by asset owners/trustees, cryptographic encryption and mathematical hash algorithms and other methods and procedures to deliver a highly efficient and secure environment for the creation of various digital assets and the execution, recording, verification and validation of those assets and all post enrollment transactions related to those assets and their subset elements. And to verify the accuracy and authenticity of digital assets in their entirety and/or certain predefined Asset Elements (AE) and report complex or "binary" results. Using an implementation of Monti Carlo theory to select an instance generated random or pseudorandom sample size and random selection of nodes along the chain to be sampled.

BACKGROUND OF THE INVENTION

Individuals and companies currently access store and transport data across public and private networks that are becoming increasingly less secure, jeopardizing the privacy and security of individuals, the security of companies and corrupting information flows across private and public networks. Additionally, existing network data methods and systems make it difficult to verify the validity of the data moving across those networks and for those owners of assets to protect their privacy while operating securely.

The rate of growth for data accessed, transacted upon, stored and transported across these public and private networks is growing at exponential rates year over year and will continue to do so for the foreseeable future. The rate of growth necessitates systems that can provide broadly distributed highly accessible data assets in ways that protect the security of the asset and privacy of its owner while operating at high levels of efficiency with dynamic scalability in an increasingly chaotic digital realm.

Currently Blockchain implementations lack the dynamic ability to provide flexible access and verification to digital assets and their subsets of information in a seamless and timely manner. The existing methods limit the ability for participants to validate and reference actual digital assets as a part of the overall process, instead relying solely on hash representations to confirm transactional activities. This is highly limiting to the overall implementation of Blockchain technologies and its' uses for the storage, management, transport, verification, and validation of digital assets more complex then financial and payment transactions. Given the exponential growth of data flows Blockchain as imagined today faces extreme issues of scalability and therefore sustainability. As such, considering the foregoing, it may be appreciated that there continues to be a need for novel and improved devices and methods for blockchain systems for providing efficient and secure distributed data access, data storage and data transport.

SUMMARY OF THE INVENTION

The foregoing needs are met, to a great extent, by the present invention, wherein in aspects of this invention, enhancements are provided to the existing model of blockchain systems for providing efficient and secure distributed data access, data storage and data transport.

In an aspect, the dynamic blockchain system provides a secure and highly efficient means for businesses and individuals to structure overall data asset storage, gain and grant access to data assets, and verify and validate entire documents and concurrently or independently verify and validate separately defined data elements defined as a subset within those complete data assets.

In related aspects, the dynamic blockchain system provides a means to distribute data assets in their entirety and as numerical representations, hash functions, across numerous data storage points; and, to provide verification of those documents or their respective individual data elements, or the ability for Asset owners to access and compare entire documents securely and efficiently. The tiered structure of the invention utilizing complete and hashed elements provides an infrastructure that allows for broader use of blockchain technology. The structure detailed herein allows for complex digital assets to be stored in their entirety for reference by asset owners while also allowing those assets and subset elements to be used to provide highly efficient verification and validation of assets, transactions related to those assets or subsets and additional processes as may be defined.

In other related aspects, existing public and private networks as well as updated network infrastructure will continue to provide the means of data transport and storage with the dynamic blockchain system providing the multi-tiered security, highly efficient parent file and subset element verification and/or validation that will enable the overall system to offer easy high-speed access and verification even as data continues its exponential growth path.

In yet other related aspects, the dynamic blockchain system utilizes a highly distributed storage structure across numerous nodes of public and/or private networks to store complete data assets, complete independently defined elements within data assets, algorithmically derived HASH number representation of verifiable information related to each data asset and its represented subset of individual data elements within those data assets.

In related aspects, validation of each data asset complete or data element within the asset takes place by comparing the entire data asset or subset element to separately stored copies of each and/or accessing the HASH representation of the data Asset or subset element for match and verification.

In other related aspects, Using a random number generating algorithm derived according to mathematical constructs such as "Monti Carlo Theory" the number of storage nodes needing to be queried is significantly reduced by using a sampling function that provides for rapid data verification and if desired second and/or third function repetition for validation of the original result. This sampling methodology increases the security of the data structure by randomly or pseudorandom determining the number of nodes to be verified, within a defined "fewest and most" limit and randomly selecting those nodes to be accessed and verified.

In related aspects, all data assets and subset data elements can be encrypted prior to transport across any public or private network and each is stored on those networks fully encrypted. Decryption of complete assets, elements, or hash representations of either occurs at a predefined location within the network such location(s) be singular or multiple depending on the ownership definition.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a schematic diagram illustrating a dynamic blockchain system, according to an embodiment of the invention.

FIG. 7A is a schematic diagram illustrating a dataflow for a digital asset propagating from the dynamic blockchain management server to complete and hash asset node servers, according to an embodiment of the invention.

FIG. 8 is a flowchart illustrating steps that may be followed, in accordance with one embodiment of a dynamic blockchain method or process.

DETAILED DESCRIPTION

Figure 2A:
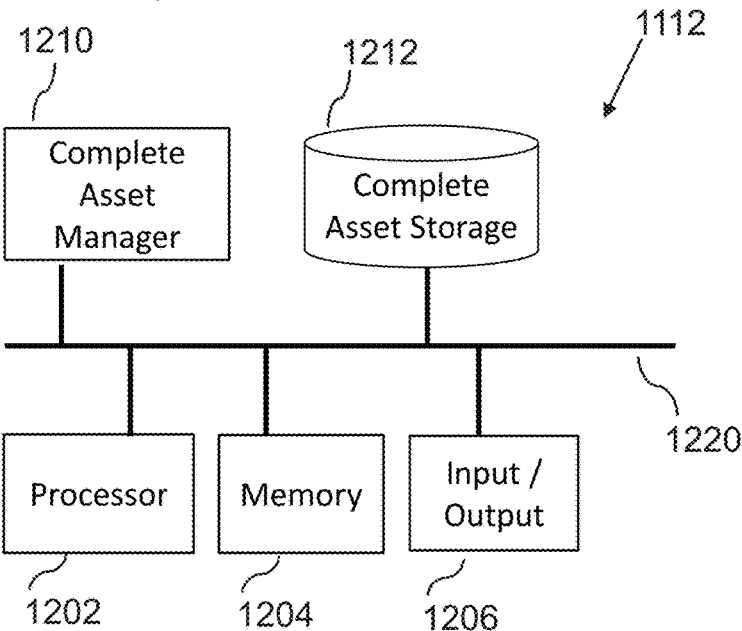
FIG. 2A is a schematic diagram illustrating a complete asset node server, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a dynamic blockchain system 1100 with reference to FIG. 1, in such manner that like reference numerals refer to like components throughout; a convention that we shall employ for the remainder of this specification.

In various embodiments, the dynamic blockchain system 1100 provides a distributed storage methodology that allows for broadly distributed storage of data assets composed of single and/or multiple identify components or variables. The integrity of the blockchain object constructed is maintained, such that a entire plurality of nodes contain data-information with a first plurality of nodes holding full perfect copies of such information, while an additional second (typically larger) plurality of nodes contain perfect hash representations of the base information. This allows the dynamic blockchain system 1100 to always contain greater than a single copy of the base information, while limiting the number of nodes containing such information in-order to reduce storage use and processing lag. The remaining information can be stored as hash representations of the base information and some combination of full base documents and hash representations can be polled on a random basis determined by statistical significance and a method of random number generation. All information, complete or hashed, is stored encrypted at each node.

Figure 3A:
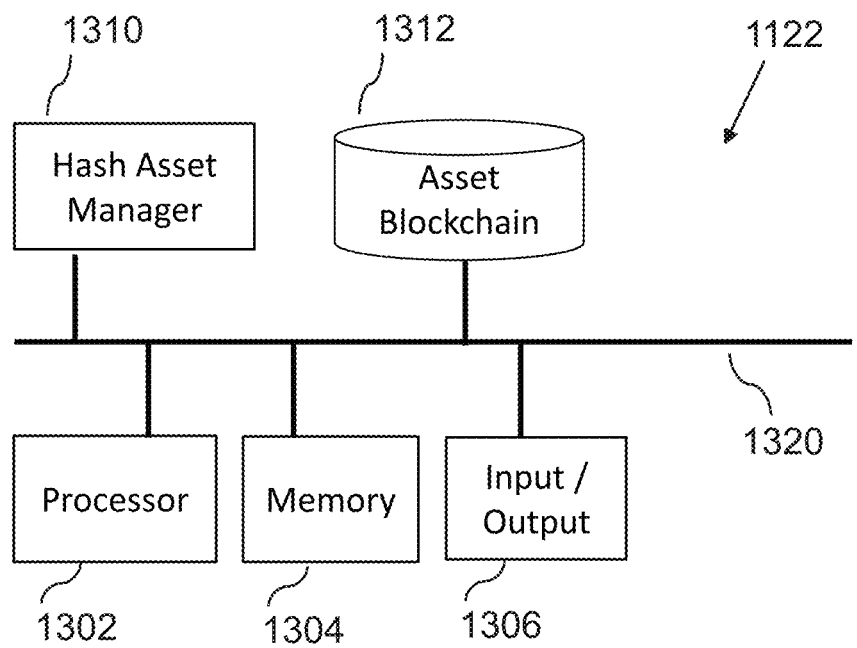
FIG. 3A is a schematic diagram illustrating a hash asset node server, according to an embodiment of the invention.

In an embodiment, as shown in FIGS. 1, 2A, and 3A, a dynamic blockchain system 1100 can include:

a) at least one complete asset node server 1112, which is configured to store complete versions of digital assets 1248, such as documents in their source format;

b) a plurality of hash asset node servers 1122, wherein each hash asset node server stores a copy of an asset blockchain, which includes cryptographic hashes of the digital assets 1248 for secure preservation and validation of the complete versions of the digital assets 1248;

c) a dynamic blockchain management server 1102, which receives and processes requests to add, update, and validate the complete versions of the digital assets 1248; and d) a dynamic blockchain management device 1104, which enables a user 1150 to interact with the dynamic blockchain management server 1102;

wherein the dynamic blockchain management server 1102 can perform an asset validation of a digital asset 1248 by lookup with a lookup asset identifier 1241 and a lookup version number 1244 to retrieve a corresponding version of the digital asset 1248 in the at least one complete asset node server 1112 and by verification of the digital asset by a random sampling in a statistically representative number of hash asset node servers 1122 in the plurality of hash asset node servers 1122, such that an asset block 1330 of the asset blockchain 1312 matches the lookup asset identifier 1241, the lookup version number 1244, and a cryptographic hash of the digital asset 1248, for each hash asset node server 1122 in the statistically representative number of hash asset node servers 1122;

wherein the validation of the digital asset 1248 is successful if at least a predetermined minimum validation threshold of hash asset node servers 1122 in the statistically representative number of hash asset node servers 1122 validate the digital asset 1248.

In a related embodiment, the minimum validation threshold of hash asset node servers 1122 can be a validation proportion threshold in a range of 50%-99%.

In a related embodiment, as shown in FIG. 2A, a complete asset node server 1112 can include:

a) A processor 1202;
b) A non-transitory memory 1204;
c) An input/output component 1206;
d) A complete asset manager 1210, which manages processing of the complete versions of the digital assets 1248; and
e) A complete asset storage 1212, which stores a plurality of records comprising the complete versions of the digital assets; all connected via
f) A data bus 1220.

Figure 2B:
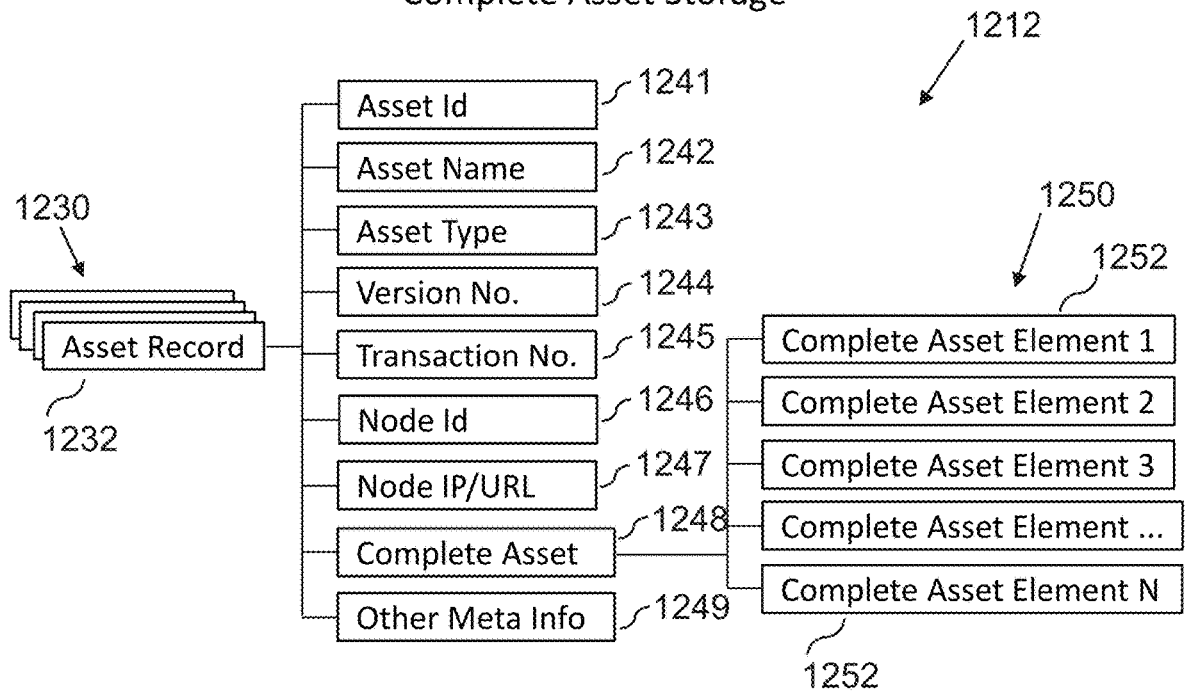
FIG. 2B is a schematic diagram illustrating a complete asset storage, according to an embodiment of the invention.

In a further related embodiment, as shown in FIG. 2B, the complete asset storage 1212, can include a plurality 1230 of asset records 1232, which each can include a combination or all of:

a) A first asset identifier 1241, which can be an asset identification number 1241, which can be a unique identifier, such as a GUID or UUID;
b) An asset name 1242;
c) An asset type 1243;
d) A first version number 1244;
e) A first transaction number 1245;
f) A node (Server) identifier 1246;
g) A node IP 1247 (or uniform resource locator 1247);
h) A complete asset object 1248 (also referred to as the digital asset 1248), which can further include
   i. a plurality 1250 of asset elements 1252; and/or
i) other meta information 1249, such as description, timestamp, etc.

A complete asset object 1248 can for example be an identification document 1248, which includes a plurality of asset elements 1252, including name 1252, date of birth 1252, driver's license number 1252, passport number 1252, social security number 1252, etc. In another example embodiment, a complete asset object 1248 can be a MICROSOFT WORD™ or other type of document, and the asset elements 1252 can be metainformation associated with the document, such as timestamp, author, etc.

In a yet further related embodiment, all or at least some fields 1241, 1242, 1243, 1244, 1245, 1246, 1247, 1248, 1249, 1252 of the asset record 1232 can be encrypted.

In various embodiments, the complete asset storage 1212 can be implemented as a database table 1212, a linked structure 1212, or other data structure 1212, or combination of data structures 1212. The plurality of asset elements 1352, can be a fixed number of optional elements, or can be implemented as a variable length/number structure, for example in the form of a linked list.

Figure 3B:
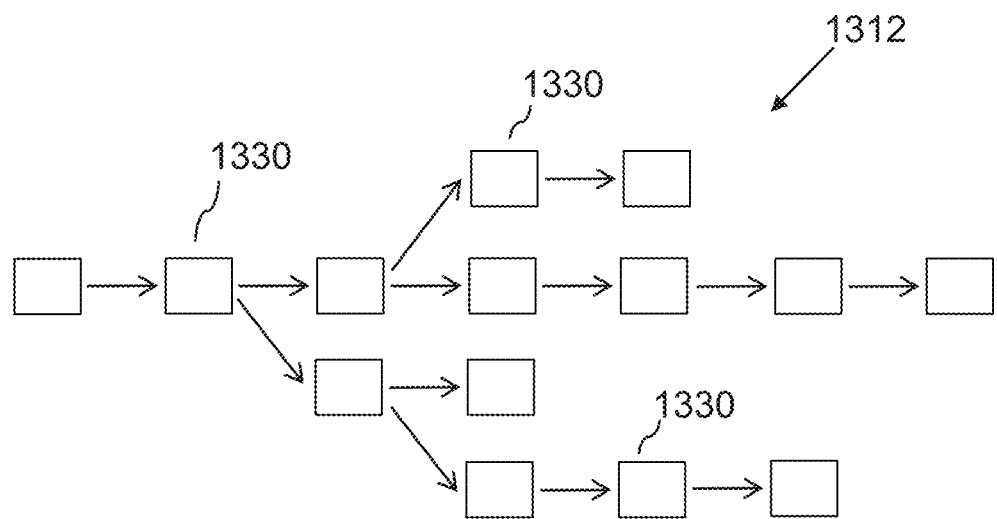
FIG. 3B is a schematic diagram illustrating an asset blockchain, according to an embodiment of the invention.

In a related embodiment, as shown in FIGS. 3A and 3B, a hash asset node server 1122 can include:

a) A processor 1302;
b) A non-transitory memory 1304;
c) An input/output component 1306;
d) A hash asset manager 1310, which manages processing of the asset blockchain 1312; and
e) An asset blockchain 1312, comprising a linked structure 1312, which can be a list, tree or network, of asset blocks 1330, wherein each asset block 1330 includes a hash representation of a version of the digital asset; all connected via
f) A data bus 1320.

Figure 3C:
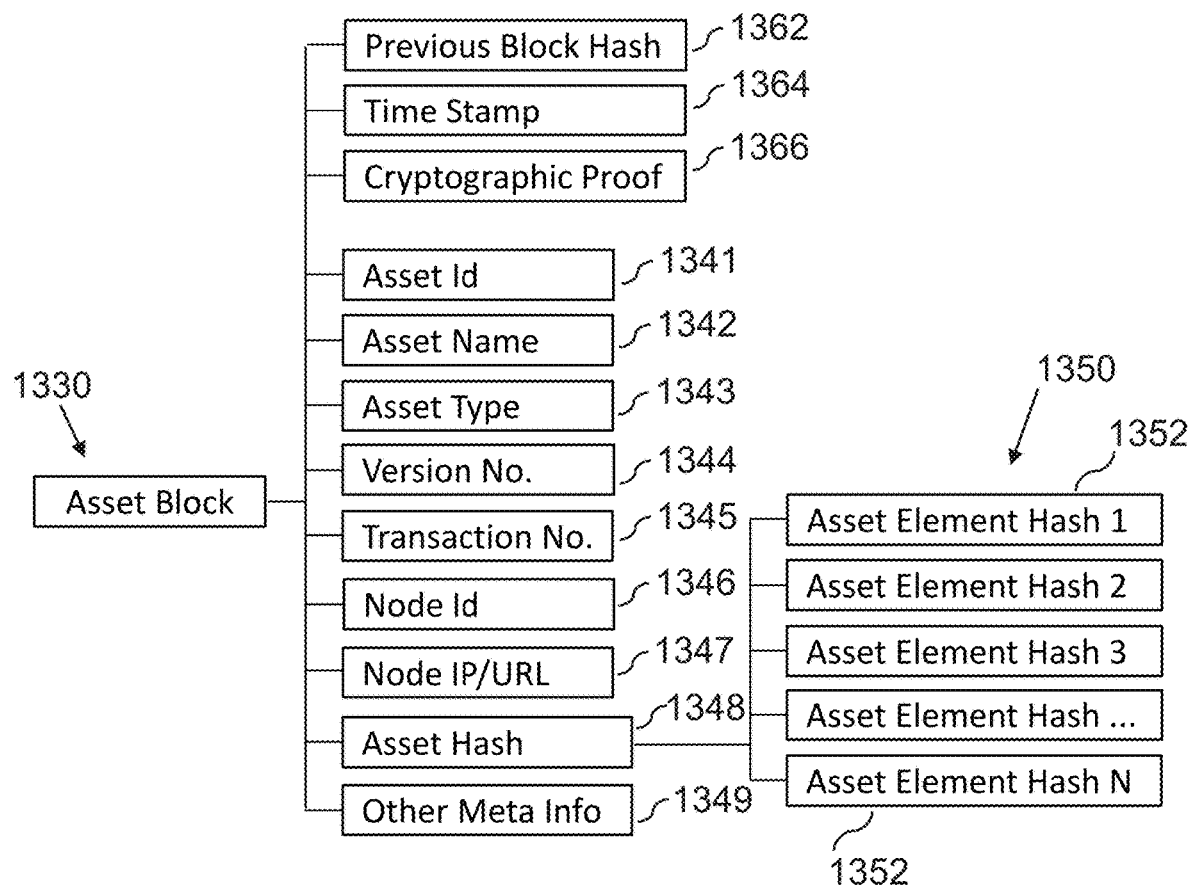
FIG. 3C is a schematic diagram illustrating an asset block, according to an embodiment of the invention.

In a further related embodiment, as shown in FIG. 3C, an asset block 1330, can include:

a) A previous block hash 1362;
b) A time stamp 1364;
c) A Cryptographic proof 1366, which for example can be a proof of work 1366, a proof of stake 1366, a verifiable delay function proof, or other type of cryptographic proof, or a combination of these;
d) A second asset identifier 1341, which can be an asset identification number 1341, which can be a unique identifier, such as a GUID or UUID;
e) An asset name 1342;
f) An asset type 1343;
g) A second version number 1344;
h) A second transaction number 1345;
i) A node (Server) identifier 1346;
j) A node IP 1347 (or uniform resource locator 1347); and
k) An asset hash 1348, which is a cryptographic hash of the complete asset object 1248, which can further include
   i. a plurality 1350 of asset element hashes 1352, which are cryptographic hashes of the asset elements 1252.

In a yet further related embodiment, the dynamic blockchain management server can be configured to perform an asset validation of the digital asset by:

lookup with a lookup asset identifier and a lookup version number to retrieve a corresponding version of the digital asset in the at least one complete asset node server, such that the lookup asset identifier matches the first asset identifier and the lookup version number matches the first version number; and by verification of the digital asset by a random sampling in a statistically representative number of hash asset node servers in the plurality of hash asset node servers, such that each asset block matches the lookup asset identifier, the lookup version number, and a cryptographic hash of the digital asset, for each hash asset node server in the statistically representative number of hash asset node servers, such that the lookup asset identifier matches the second asset identifier, the lookup version number matches the second version number, and a calculated cryptographic hash of the version of the digital asset matches the asset hash.

In another yet further related embodiment, all or at least some fields 1362, 1364, 1366, 1341, 1342, 1343, 1344, 1345, 1346, 1347, 1348, 1352 of the asset block 1330 can be encrypted.

Figure 4A:
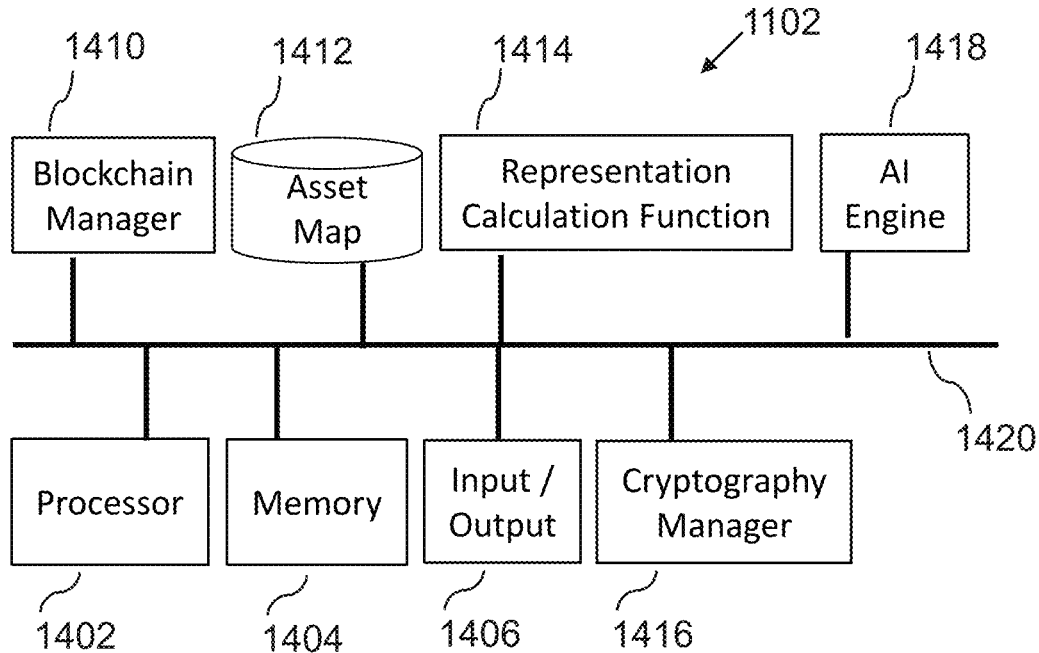
FIG. 4A is a schematic diagram illustrating a dynamic blockchain management server, according to an embodiment of the invention.

In a related embodiment, as shown in FIG. 4A, a dynamic blockchain management server 1102 can include:
a) A processor 1402;
b) A non-transitory memory 1404;
c) An input/output component 1406;
d) A blockchain manager 1410;
e) An asset map 1412, which is configured to allow lookup of the corresponding complete asset node servers 1112 and corresponding hash asset node servers 1122 that correspond to the digital asset 1248;
f) a representation calculation function 1414, for calculating the statistically representative number of hash asset node servers in the plurality of hash asset node servers based on a function input of the total number of hash asset node servers; and
g) A cryptography manager 1416, for calculating a cryptographic hash for assets and asset elements, and encrypting and decrypting assets and asset elements; all connected via
h) A data bus 1420.

In a further related embodiment, the statistically representative number can be a function of the size of the blockchain and the number of nodes. The only minimum for the statistically representative number will be that it meets generally accepted minimums for providing a statistically significant result. The statistically representative number can be any number greater than that based on rules of the blockchain which can be adjusted based on the importance or failure risk of the stored information.

In a further related embodiment, the representation calculation function 1414 can be configured to use well-known methods from the field of sample size determination, and can for example be implemented as a lookup table, which can be based on Mead's resource equation, cumulative distribution functions, or other methods; or can be a linear or non-linear function, such as a ratio/proportion of the total number of hash asset node servers 1122, for example in a range of less than 10%, 1%-10%, or 0.1%-10% of the total number of hash asset node servers 1122, such that the statistically representative number of hash asset node servers is at most 10% of the total number of hash asset node servers 1122, or alternatively at most 15%, 20%, or 25% of the total number of hash asset node servers 1122.

Figure 4B:
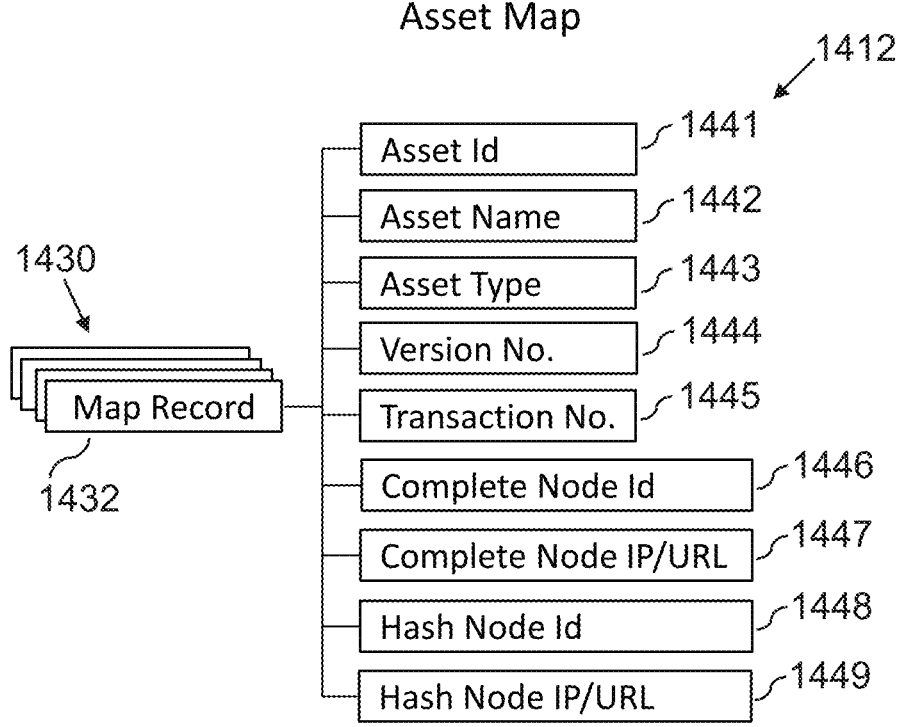
FIG. 4B is a schematic diagram illustrating an asset map, according to an embodiment of the invention.

In a further related embodiment, as shown in FIG. 4B, the asset map 1412, can include a plurality 1430 of map records 1432, which each can include a combination or all of:
a) A map asset identifier 1441, which can be an asset identification number 1441, which can be a unique identifier, such as a GUID or UUID;
b) An asset name 1442;
c) An asset type 1443;
d) A map version number 1444;
e) A map transaction number 1445;
f) A complete node identifier 1446, which is an identifier of the corresponding complete asset node server 1112;
g) A complete node internet address 1447, which can be an IP address 1447, a uniform resource locator 1447, or a socket 1447 including an IP address and a port number;
h) A hash node identifier 1448, which is an identifier of the corresponding hash asset node server 1122; and
i) A hash node internet address 1449, which can be an IP address 1449, a uniform resource locator 1449, or a socket 1449 including an IP address and a port number.

In a yet further related embodiment, the at least one complete asset node server can be located by lookup of the complete node identifier in the asset map, such that the lookup asset identifier matches the map asset identifier and the lookup version number matches the map version number; and
wherein the statistically representative number of hash asset node servers are located by lookup of corresponding hash node identifiers in the asset map, such that the lookup asset identifier matches the map asset identifier and
the lookup version number matches the map version number.

In another yet further related embodiment, all or at least some fields 1441, 1442, 1443, 1444, 1445, 1446, 1447, 1448, 1449 of a map record 1432 can be encrypted.

In a yet further related embodiment, the complete node internet address 1447 and the hash node internet address 1449 can be uniform resource locators.

In a yet further related embodiment, the dynamic blockchain management server 1102 can further include:
an artificial intelligence engine 1418, which can enable the dynamic blockchain system 1100 to utilize machine learning and artificial intelligence to dynamically manage process execution, including dynamic data storage, multiple storage states, tiered security, hash functions, cryptographic methodology, and transport, storage, and communications functions, in order to deliver efficient processing. Such efficient processing having variable considerations for speed of each transaction, levels of validation needed for each transaction, optimized transport channels, and transport and storage security. The artificial intelligence engine 1418 can include certain minimal and maximal parameters for various transactions types and the AI engine can learn and adjust through the execution of transactions for optimal execution in a variable environment that often includes rapidly changing execution criteria.

Figure 5:
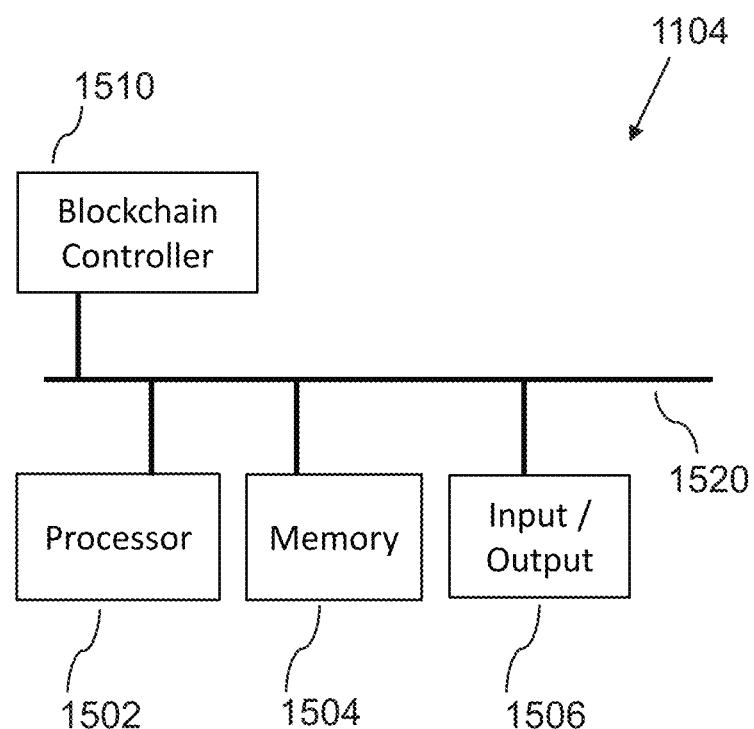
FIG. 5 is a schematic diagram illustrating a dynamic blockchain management server, according to an embodiment of the invention.

In a related embodiment, as shown in FIG. 5, a dynamic blockchain management device 1104 can include:
a) A processor 1502;
b) A non-transitory memory 1504;
c) An input/output 1506; and
d) A blockchain controller 1510, which communicates with the blockchain manager 1410 in order to enable the user 1150 to interact with the dynamic blockchain management server 1102; all connected via
e) A data bus 1520.

In a related embodiment, the dynamic blockchain system 1100 provides the ability for real-time transactions by implementing a n>1 sampling technique, wherein at least one of the full document information nodes can be sampled and an additional number of nodes (can be a combination of full or hash representation noes) can be sampled at a numeric frequency providing a statistically significant sample rate.

Transactions as used herein refer to an action that checks existing information to validate that that the information is true, wherein the information for example can be an account balance, persons age, address, property title, etc. A complex transaction can include a validation and a new input to the database that modifies existing information.

In related embodiments, writing to the database follows the general rules of Blockchain in that information must be recorded as new documents at each node, such that the existing complete or hash documents are maintained, and new information inputs are deposited at each node in the format previously held by that node (complete or hash). The dynamic blockchain system 1100 can function with either a serial or parallel read write depending on the system configuration, though classic blockchain implementation operates via serial read/write.

In a further related embodiment, in order to accommodate multiple reads and writes updating the dynamic blockchain system 1100 writes to (i.e. updates) nodes on the blockchain object and maintains a record of the locations of a statistically significant number of nodes. These nodes become the base nodes for additional rapid transactions made against the same transaction account or transaction records, until such time as all nodes on the chain have been updated.

While the subset of control nodes creates the basis for additional transaction verification in the blockchain the process of writing information to all nodes on the chain continues in the background. A new sample of nodes can be taken from those nodes with up to date information periodically or a new sample can be taken for the first transaction after all nodes are confirmed updated on the blockchain. In either event the nodes for new samples follow the process of sampling a statistically significant number of nodes using the random process and other criteria detailed throughout the Dynamic Blockchains process.

Information=Confirm and validate information:
a) Request to confirm information is made
b) Statistically significant number of nodes to be queried is determined
c) Node locations to be queried are randomly determined
d) Selected random nodes are queried
e) Results are returned to determine if information matches
f) Information return is either true or false
g) Information from a predetermined minimum number of nodes (but not less than 50%+1)
  i. Is returned true and validated
  ii. Is returned false and not validated
h) Results are reported, as either positive/true or negative/false
i) The process may be looped for several passes depending on the system rules and level of confirmation desired by the parties to the transaction.

The above can be used as the process for validating any document or subset of information contained within the blockchain in a highly secure and highly efficient manner.

This information can be personal, property or the precursor to recording a new transaction:

Information is validated/confirmed, and a new transaction is now recorded, such that:
a) Above steps undertaken;
b) New Transaction is input and ready to write to the blockchain;
c) Statistically significant number of nodes to write to is determined;
d) Node locations to write to are randomly determined;
e) Nonpersistent record of initial nodes to write to is created;
f) New recorded is written to initial locations;
g) New information continues to write to all nodes;
h) Once all nodes have recorded the new information/document the nonpersistent record of initial writes is destroyed;
i) If a transaction occurs that requires a write prior to all nodes being updated:
  i. The record of initial write nodes and queried to validate the information existing;
  ii. The initial write nodes are updated with the new record and a second or x processes is created to update all nodes with the newest transaction;
  iii. Additionally, the initial node write can be expanded during the updated process and upon a new statistically significant number of nodes be updated, such that a random process can run to create a new validation and new set of initial nodes interim to all nodes being updated.

In related embodiments, dynamic blockchain systems and methods disclosed herein provide a highly efficient and secure infrastructure for acquiring and managing digital assets 1248 for distributed data access, data storage and data transport across public and private networks, such that assets can be updated to record all transactions, and wherein any member of the blockchain can verify assets and their elements and easily validate those verifications. The dynamic blockchain system 1100 uses random selection as guided by minimum requirements determined using statistical significance with a combination of asset types, complete assets (entire documents or records), predefined elements (subset of complete assets for specific information verification) and mathematically derived hash representations of those complete and element records for broad distribution across nodes of the network.

In related embodiments, assets can be digital representations of:
a) documents;
b) recordings;
c) financial transactions; real property records; or
d) any type of digital representation of a physical asset or information about that asset, including pictorial and graphical representations.

In a related embodiment, an element can be a predefined attribute or combination of subsets to the primary asset. Elements can be included with the complete asset in a parent folder with each element being assigned metadata that identifies it to the complete asset, while allowing it to be independently verified. Complete hash and element hash files can be constructed in the same parent file format and can provide verification as to the complete parent files. Examples of an element can include:
a) an identity element, which can include first and last name, date of birth, residence state and city, address information, citizenship, etc.; and
b) medical records information: vaccination records, insurance, blood type, identity information, test results, active and historic diagnoses, etc.;
c) Financial information: Asset list, Asset loans and encumbrances, Earned Income;
d) Dividend income, expenses;
e) Financial Transactions and Payments; and
f) Real Property: Property Title, Taxes, Assessments, Loans, Liens, etc.

In a further related embodiment, digital assets may be created within the blockchain itself, imported from specific programs directly interfacing with the blockchain and/or be submitted by those having privilege of access to the blockchain. Digital assets can be newly created or legacy assets.

In another related embodiment, the dynamic blockchain system 1100 can allow for the management of numerous asset types and via use of elements can allow for owners of those assets to divulge and allow for the verification of discreet elements of their person, business, financial, medical, or other records, without requiring that the complete document be released or verified. This method allows for the owners of these digital assets to control the release of asset related information more granularly, thus providing increased security and privacy for individuals and businesses in a highly scalable and efficient environment.

In a further related embodiment, complete document and element files number relatively few, such that primarily those who own or have regulatory requirements or are granted those rights by the owner will have complete parent document files available to them within the dynamic blockchain. These special complete files provide additional ability to verify and validate assets, particularly in the instance where assets are corrupted. Limiting the number of these special nodes builds a highly efficient and easily scalable dynamic blockchain.

In a related embodiment, parent hash files can be broadly distributed across nodes within the blockchain. These light weight highly efficient hash files provide a very quick and secure way to verify an asset and/or to verify and element, such as: age, ownership, vaccination, and citizenship In another related embodiment, transactions within the dynamic blockchain system 1100 refer to any change of the complete asset or any element of the asset, including: financial or payment transactions, record updates, asset transfer, etc. The initial transaction for the system is the submission of the asset to the Blockchain, regardless if the asset was created within the Blockchain itself or imported. This initial Asset and its elements, if any, are processed to create representative Hash files and prepared for distribution across nodes of the blockchain. The nodes for distribution in the blockchain can be to all registered nodes or to some subset of nodes. As noted above, it is anticipated that complete assets can be distributed to a limited number of nodes, while hash files are distributed broadly to many nodes, with minimum distribution being determined by principles of statistical significance.

In a further related embodiment, if distribution is to be to a limited subset of nodes, the dynamic blockchain system 1100 can allow for a random number generator to determine those nodes that will be used for storage of each asset type and a dynamic blockchain management server 1102 can record the location of those nodes.

In another further related embodiment, future transactions can either update all nodes where the asset has been stored in the last transaction or use the random number generator with predetermined parameters to assign the transaction update to a new series of nodes, while maintaining recorded information for all previous transactions and their complete and hash parent files. The Random assignment of node locations provides additional security to the files reducing the probability that files can be tracked, accessed, deleted or in some other way corrupted. All previous files remain and can be accessed as needed to provide further verification of validation.

In another related embodiment, verification and validation functions in the instant invention are performed using random sampling according to predetermined parameters and using the random Number generator functions of the Blockchain Manager. Using predetermined upper and lower limits for the number of nodes to be checked when a verification request is received the Blockchain Manager Generates the processes for randomly selecting those nodes to be sampled, which can be as simple as a random skip function or a more complex random determination algorithm. Once the process selecting the nodes is determined the random generator using Monte Carlo theory, or other types of proven random selection methods, determines the number of nodes to be selected. Using the sampling method of the instant invention regardless of the file type to be verified the process will be significantly faster and due to the random selection of nodes that are to be sampled significantly more secure from tracking and data hacking and corruption. An additional benefit of the invention is the highly efficient nature of the system allowing for multiple iteration of the process to validate the initial verification and if needed determine those system nodes that have been corrupted.

In yet another related embodiment, transaction information in its encrypted state can be copied and returned to the blockchain manager xxx for comparison and verification according to predetermined rules; or, a comparison file can be provided or randomly accessed with that file, such that the encryption keys used to compare each file at the node, report a positive or negative result and re encrypt the node file while destroying the caparison file when complete. All assets on the blockchain can be stored fully encrypted, regardless if they are complete parent files or hash parent files.

Figure 6:
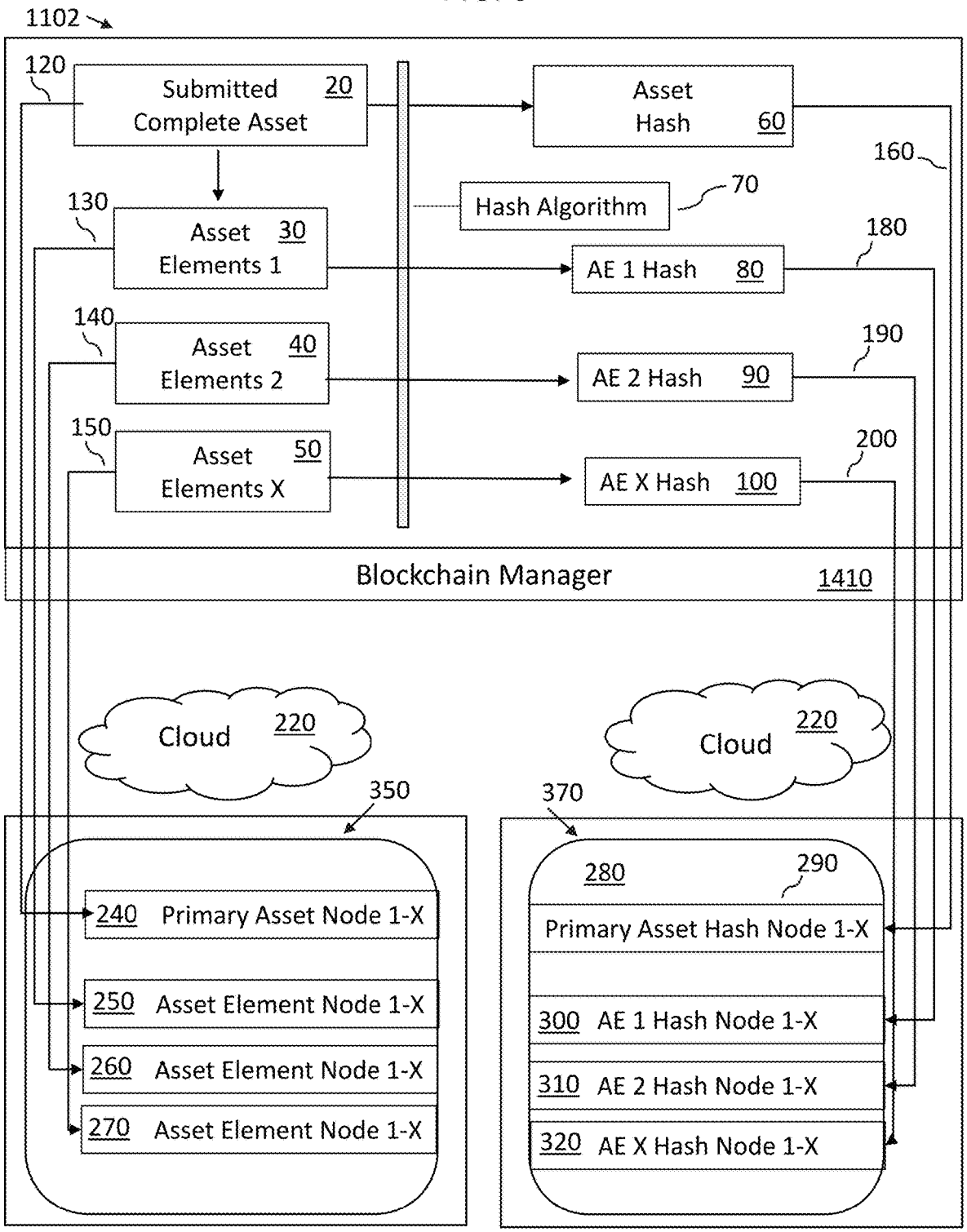
FIG. 6 is a schematic diagram illustrating a dataflow for adding a complete asset to the dynamic blockchain system, according to an embodiment of the invention.

In a related embodiment, FIG. 6 shows the data flow process wherein an asset can be submitted to the dynamic blockchain management server 1102 with the asset being described as at least a complete Asset 20 containing all necessary information and possess the ability to contain asset elements 30, 40, 50 that are stored as subsets of the complete asset, and comprised within the complete asset, but for which individual access is desirable to provide for fast system operation, improved overall security and increased privacy. The data flow process can include:

a) when submitted and processed, the assets can be processed by a hash algorithm 70 creating a mathematical hash representation 60, 80, 90, 100 of each complete asset 20 and asset element 30, 40, 50;

b) complete assets, asset elements and hash representations can be processed by a cryptography manager 1416 in communication with the blockchain manager 1410 to encrypt each complete asset, each asset element and each hash;

c) each complete asset and element can be assigned metadata by the blockchain manager 1410, which identifies each component that are part of a complete parent file, and assigns additional information to later identify each parent file element, such that it can be found and verified as part of the complete file and/or independently. Hash parent files can be created using the same principles as complete files with each hash parent file including complete asset hash and each element hash able to be located and verified as a parent file and/or each component element, such that each can be located, identified, and validated independently or in any combination as may be defined;

d) Multiple copies of complete parent files 350, can be created using the processes described with each parent file being assigned a different node location by the owner or by random process and that is recorded by the blockchain manager 1410 and the file is sent via a network, including transport connections 120, 130, 140, 150, such as a public or private cloud, to the assigned node location for storage and later reference as needed. Complete files replication and storage can be defined by the owner of the files. Transport;

e) Multiple copies of the hash parent files 370 using the processes described with each hash parent file 370 being assigned a different node location that is recorded by the blockchain manager 1410 and the file is sent 120, 130, 140, 150 via the network/cloud 220 to the assigned node location 240, 250, 260, 270 for storage and later reference as needed. Hash parent files replication is defined by the owners of the files and/or using random selection within predefined minimum and maximum number of nodes 280, 290, 300, 310, 320 that must be addressed with the hash information.

In another related embodiment, FIG. 7A shows the propagation 500, 400, 410, 420, 430, 440, 450 of parent files moving through the cloud 106, wherein the cloud 220 can be composed of some combination of private and/or public networks and individual servers and storage locations, "nodes" 600, 610, 620, 630, 640, 650, within those public and private networks. Each cloud 220 can be contained on an entirely private or entirely public network. Parent files include complete parent files and hash parent files. Thus, FIG. 5 provides an overview of the logical transport of digital assets and their individual elements from their moment of submission through the creation of digital hash 70 representations of these complete assets and subset elements and distribution of those assets and elements as they are encrypted in communication with the blockchain manager 1410 and distributed 500 to the cloud, and to individual nodes 600, 610, 620, 630, 640, 650 for secure storage across nodes.

In a further related embodiment, each Parent file and each of the parent files primary and subfiles (elements) can be stored at the assigned node 240, 250, 260, 270, 280, 290, 300, 310 fully encrypted.

Figure 7B:
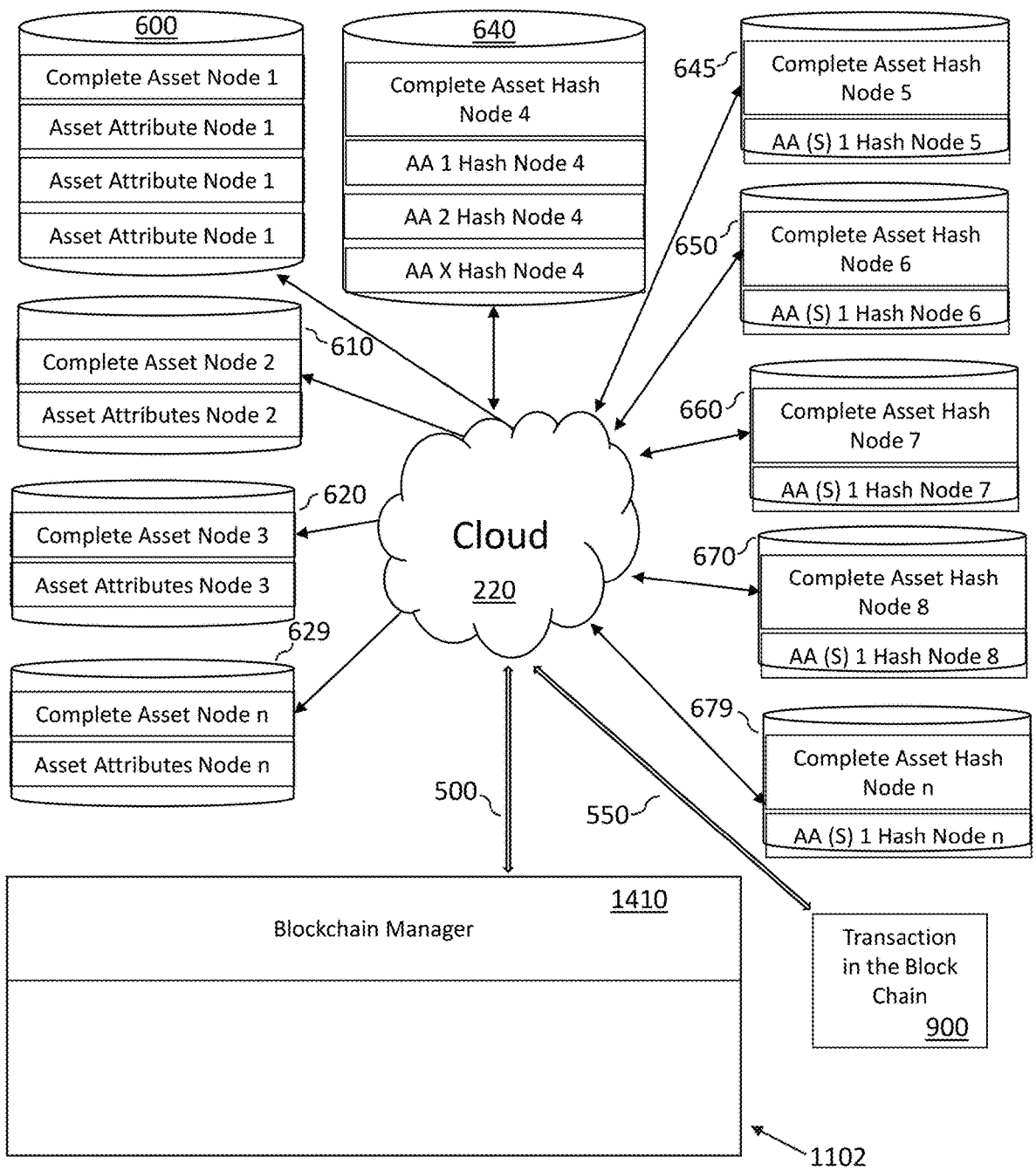
FIG. 7B is a schematic diagram illustrating a dataflow for a transaction in the dynamic blockchain system, according to an embodiment of the invention.

In yet a related embodiment, FIG. 7B shows a transaction 900 that has taken place within the blockchain. The transaction can be an initial transaction to create a new blockchain asset or it can be a transaction causing an update to and existing asset within the Blockchain. Transactions 900 are initiated and transmitted 550 though the cloud 220 to the blockchain manager 1410 cloud connection 500. Asset updates and recording transaction is performed by the dynamic blockchain management server 1102, and processed and distributed 500 across the cloud 220 to selected nodes. A new file is added to each asset type at every ledger entry. All previous entries remain. Transaction updates can include a complete asset update, an asset element update, or both; with associated asset hash and asset element hash updates.

In a further related embodiment, creating a new asset follows those procedures as described above in relation to FIGS. 6 and 7A, such that a transaction is created, parent files and element files are created, and those complete and hash parent files are processed and distributed to assigned nodes via the cloud across some combination of public and private networks and their individual server and storage location, such that:
  a) For a new (first time) transaction the blockchain manager assigns and records the type of asset being stored, which can be a complete or hashed asset, and the corresponding asset storage locations 600, 610, 620, 629, 645, 650, 660, 670, 679. The storage locations 600, 610, 620, 629, 645, 650, 660. 670, 679 for each asset may include every node on the chain or may use the random number generator to assign assets to a randomly selected number of nodes, such that each node is then randomly selected; and
  b) For a 2nd or later transaction, all steps of FIGS. 1 and 2 are completed and additionally the blockchain manager refers to the asset type and location files and sends a new updated copy of those file types to the previously assigned nodes 600, 610, 620, 629, 645, 650.

In a yet further related embodiment, the updated parent files and their elements can be stored at the node locations with additional metadata to identify the updated files as primary. Existing files can be maintained intact at all locations, for use if additional verification of an asset or any transaction against that asset is needed.

In a yet further related embodiment, alternatively, to the process described above, a second transaction can pass through all processes, as described for FIGS. 6 and 7A above, however such that the blockchain manager 1410 selects a new set of nodes for each asset type to be stored using a random number generator algorithm to select the set of nodes where the parent files are to be stored. In this alternative embodiment, the blockchain manager 1410 can make note (i.e. register/record) of the new transaction parent files node location and adds this as the updated file to the blockchain manager asset map 1412. The blockchain manager 1410 maintains all previous asset and location map entries for reference later to previous assets if needed for additional verification or asset recovery. All assets on the blockchain can remain at their storage nodes fully encrypted.

Figure 7C:
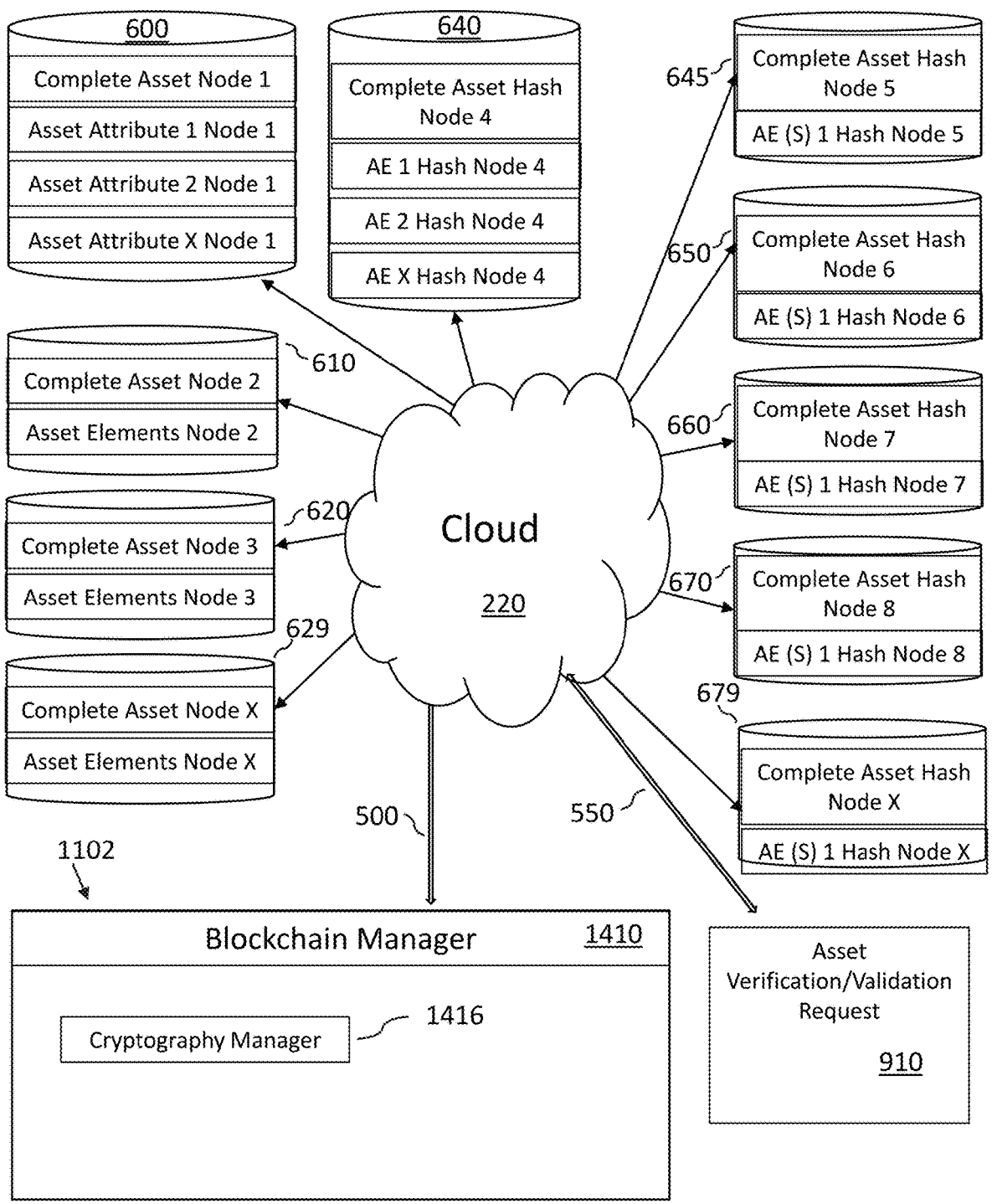
FIG. 7C is a schematic diagram illustrating a dataflow for an asset verification request in the dynamic blockchain system, according to an embodiment of the invention.

In yet another related embodiment, FIG. 7C shows an asset verification 910 wherein a party who has privilege or has been granted privilege for that asset has requested verification of the complete asset 600, 610, 620, 629, element(s) of an asset 640, 660, 679, or combination of asset elements 640, 660, 679 and/or the represented hash files and associated elements, such that:
  a) the owner or assignee of an asset can verify themselves or can grant to another a right to verify any component or combination of complete asset parent file 600, 610, 620, and/or hash asset parent files 630, 640, 650;
  b) The verification request 910 can be sent to the blockchain manager 1410 where the request is processed, for verification of the asset and/or asset elements of the dynamic blockchain system 1100;
  c) The verification process, regardless if it is for a single or combination of asset parent files, verifies the asset in the dynamic blockchain system 1100 by sampling at minimum some statistically significant number of nodes on the in the dynamic blockchain system 1100 to determine a positive or negative match for information stored at each of those sampled nodes; and
  d) Records for each sampled node can be returned 500 fully encrypted to the blockchain manager 1410 which decrypts the records and compares the records to the other nodes being sampled, to determine a positive or negative match with a base asset identifier, either provided with the request for verification or such base unit randomly selected to be the base unit by the Random Number Generator selection used in the Blockchain Manager.
    Alternatively, regardless if the base identifier is provided or randomly selected the base identifier can be transported encrypted to each selected sampled node with the appropriate encryption key(s) to open, compare and re-encrypt information at each node.

In a further related embodiment, on request for verification 910 the blockchain manager 1410 queries an internal random number generator of the cryptography manager 1416, using a mathematical algorithm random number generation, such as Monte Carlo simulation, to generate the number of nodes that will be sampled and for that number of nodes, the specific nodes that will be sampled. The number of nodes to be sampled can be a predetermined range of fewest to most that balances the need for minimum number of nodes that need to be sampled for statistical an system integrity and the efficiency of the system. A request for verification can be for a complete asset or can be for all or some asset elements, or a combination of these.

In another further related embodiment, the process of verification for each request can be performed a single time or multiple times, each using random selection with the additional verifications providing validation to the previous verification function and further limiting corruption within the data stream. Verification can be performed prior to recording a new transaction, and/or after recording a new transaction to verify recording of the transaction and/or Independently of a specific transaction or update to verify a file or certain element(s) (piece(s) of information).

Figure 7D:
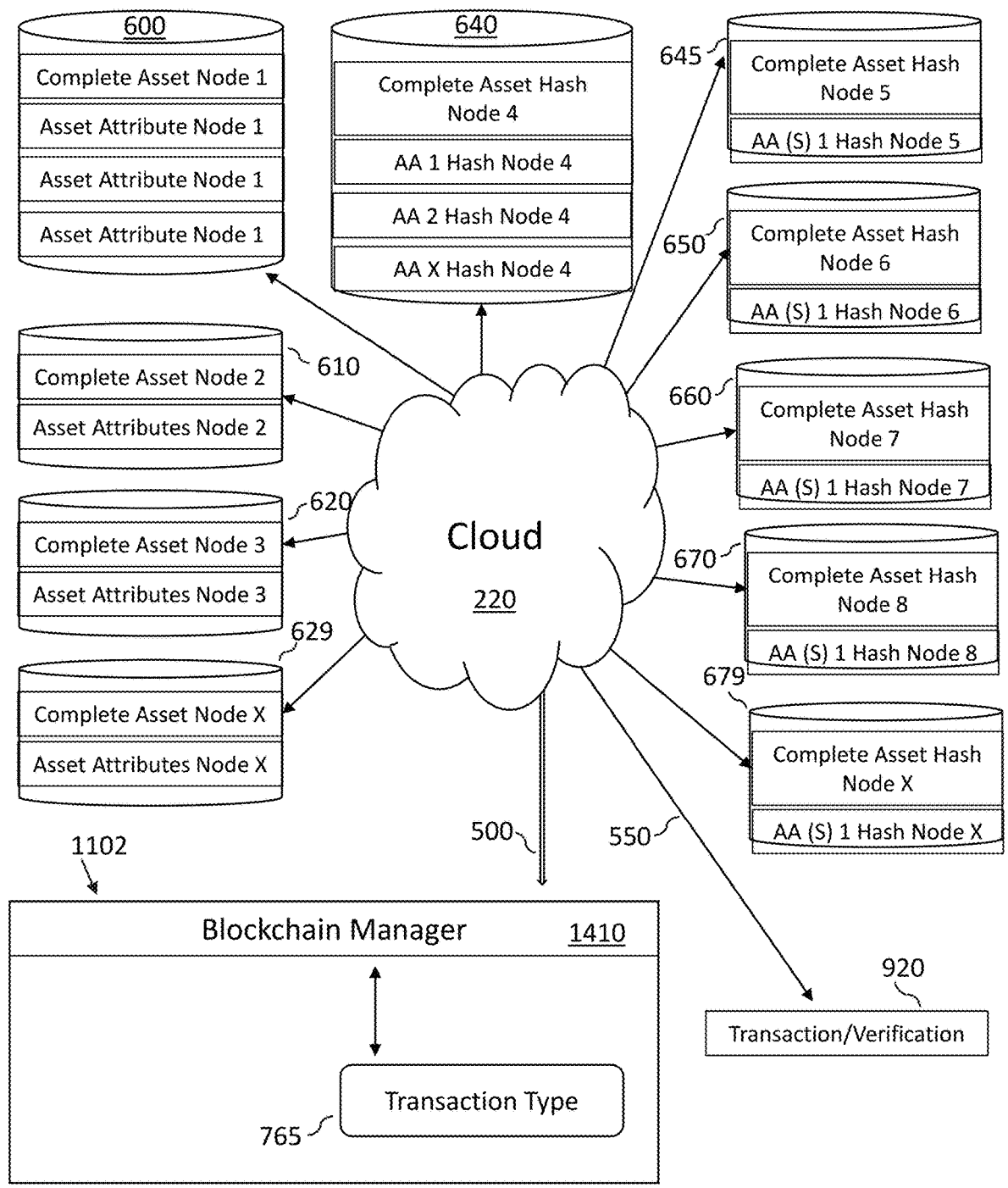
FIG. 7D is a schematic diagram illustrating system dataflow in the dynamic blockchain system for dataflows shown in FIGS. 6, 7A, 7B and 7C, according to an embodiment of the invention.

In another related embodiment, FIG. 7D shows the process of the dynamic blockchain system 1100 as detailed in FIGS. 6, 7A, 7B, and 7C, wherein the configuration of the invention receives a transaction and request for verification 920 of system assets such that initial creation of an asset, its elements and later representative hash files and parent files constitute a transaction type 765 with that type to be described and detailed according to the assets types to be stored and/or verified. The dynamic blockchain system 1100 is a logical construct of nodes 600, 640, 645, 620, etc., residing at some location upon a public or private network, or some combination thereof and accessed via the cloud 220 where the cloud is some combination of those public and private networks and the servers and storage devices attached thereto.

In related embodiments, the nodes of FIGS. 7A, 7B, 7C and 7D are representative of any number of nodes accessed through the network/cloud, wherein the number of nodes can be of plurality 1+n and where it is anticipated those nodes 600, 610, 620, 629, 630, 640, 650, 660, 670, 679 can be a large plurality.

In a related embodiment, the dynamic blockchain system 1100 can include two or more primary asset types:
a) complete assets and their complete elements that comprise full detail of the assets and all transaction records related to that asset; and
b) complete asset elements that contain some predefined piece of information that can be verified independently, and mathematical hash representations of each stored independently of the complete file and element information, providing highly efficient verification of assets or element information verification and/or validation.

In a related embodiment, location maps and asset type maps are logical constructs that can be predefined based on the number and types of members 1150 within the dynamic blockchain system 1100. Access to the asset maps can be granted according to the rules of the public or private blockchain. Files remain hashed and encrypted.

While the dynamic blockchain system 1100 has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention.

In various related embodiments, the dynamic blockchain system 1100 provides a system, methods, and procedures that allows a dynamic blockchain to store simple and complex digital assets, transactions related to those assets and transactional and independent request for verification and validation of the assets in total or some subset or combination of subset elements. The introduction and utilization of parent assets composed of complete asset records and defined assets elements coupled with the use of random assignment and random sampling create a highly efficient and scalable system that can be readily adapted to handle various types of digital assets and asset requests.

In an alternative related embodiment, an asset block 1330 can include the following metadata Information:
a) Transaction/version numbering;
b) Identifying information to determine if Hash or Full
  i. Identifying element Hash; and
  ii. Identifying element full;
c) IP/URL location information;
d) Encrypted New Hash information (for encrypted nodes);
e) Encrypted Element Hash Information (update of variable fields);
f) Encrypted Full Document information (for limited number of full doc fields);
g) Additional network transport information; and/or
h) Secure access information to access the blockchain manager, which can be variable depending on the particular blockchain.

In a related embodiment, a workflow for using the dynamic blockchain system 1100 can include:
a) A person or entity access the transactional platform (bank, business, government ngo, etc), including:
  i. Proper credentials are presented to the platform accessed;
  ii. Document (standardized) is accessed;
  iii. Request for verification of document elements is made (Balance, age, address, etc);
  iv. Transaction is entered (if desired) representing change of elements (variable fields);
  v. Transaction is securely transmitted to blockchain manager;
  vi. Including meta data and the appropriate blockchain (s) to store information;
  vii. If a new user document is version 1;
  viii. If updating a document version is revised to the successor number;
b) The blockchain manager (BCM) 1410 performs processing, including:
  i. Blockchain managers confirms valid access and transaction;
  ii. Blockchain manager References data map for blockchain location of original;
  iii. Or if new Assigns assets to nodes on the appropriate blockchain
  iv. All nodes of the blockchain being written to will be recorded as a new document;
  v. Or update and old document;
  vi. BCM will send full documents and full elements to that node or nodes that are predesignated for full documents;
  vii. And, Hash to those nodes designated as hash;
c) Verification before update:
  i. BCM determines that blockchain(s) to be queried for verification;
  ii. BCM reads information to be verified;
  iii. BCM accesses and runs algorithm to select statistically significant N to be sampled for verification;
  iv. BCM Random number generator is accessed and random selection node identifier numbers to select nodes to be sampled;
  v. A full document node (at least 1 must exist) is select to access first
    1) The full access node is queried for the information to be confirmed (element);
    2) The relevant information is retrieved;

3) Unencrypted and a hash is created;
4) This is the reference hash;
vi. BCM queries nodes selected randomly
1) Nodes are queried until the determined stat significant number is achieved;
2) Nodes can be queried in serial or parallel;
vii. Hash stored on the nodes can either be retrieved to the BCM where they are
1) Unencrypted and compared to the reference hash (created from full element);
2) Or, the reference can be encrypted and travel to each queried node;
3) Both decrypted and compared with a positive or negative result returned;
viii. Verification is achieved positive or negative according to consensus rules:
1) At last 50%+1 of those nodes queried positive to confirm;
2) BCM can set high levels according to rules;
ix. Verification can either return a positive or negative confirmation;
x. Or, if negative turn away the transaction or;
xi. If positive confirmation moves to recording a new transaction;
xii. This result in a very fast secure result from a complex blockchain with the benefit of the system increasing with as the number of nodes or number of blockchains grows;
d) Recording a new (update to transaction)
i. After positive confirmation;
ii. BCM selects new set of random nodes to write the updated information to;
iii. Number of nodes Selected follow rules of statistically significant;
iv. At least one node must be a full document node;
v. The full document node(s) is updated:
1) With new full document;
2) With each updated element;
vi. Statistically significant number of hash nodes are updated:
3) With Hash of Full Document;
4) And Hash of updated element(s);
vii. BCM creates a none persistent record of all updated nodes from step 5 and 6;
viii. Non persistent record is held until all nodes on the chain(s) have been updated;
ix. The new data blocks are added to every node of the blockchain(s) that are included in that Blockchain;
e) Multiple transactions during full Blockchain update:
x. BCM maintains the record of nodes selected and written to according to E-6 until all nodes have been updated;
xi. Transactions that occur while the remaining nodes are being updated use the BCM randomly selected reference nodes to verify additional transactions;
xii. Non persistent file from E-6 is maintained until or nodes are updated to latest or;
xiii. Until a new second set of statistically significant number of nodes including at least 1 full document node have been updated, such that:
1) This updated non-persistent file is created and used to verify subsegment transaction during that time that the entire blockchain is still updating. (This can be for very high volume where we do not have all nodes updated with all new transaction for a long time period);
2) None persistent nodes maintain full meta data including version control for each update;
3) Verification is always done using the most recent version within non persistent recorded nodes or;
4) Using a new random sample if all nodes have been updated prior to a new transaction being received;
5) Logic and meta data control version numbering and version writing, such that:
BCM always knows the reference address for each non-persistent verification record; and
BCM manages the writing of those record to the blockchain in version order oldest to newest; and
f) Proof of work or proof of stake can be used downstream to use classic blockchain validation techniques after when writing to the blockchains after the non-persistent nodes.

In related embodiments, the dynamic blockchain management device 1104 can include configurations as:
a) A web application, executing in a Web browser;
b) A tablet app, executing on a tablet device, such as for example an ANDROID™ or IOS™ tablet device;
c) A mobile app, executing on a mobile device, such as for example an ANDROID™ phone or IPHONE™, or any wearable mobile device;
d) A desktop application, executing on a personal computer, or similar device;
e) An embedded application, executing on a processing device, such as for example a smart TV, a game console or other system.

It shall be understood that an executing instance of an embodiment of the dynamic blockchain system 1100, as shown in FIG. 1, can include a plurality of dynamic blockchain management devices 1104, which are each tied to a corresponding user 1150 or a plurality of users 1150, such that each dynamic blockchain management device 1104 enables a corresponding user 1150 to interact with the dynamic blockchain management server 1102.

An executing instance of an embodiment of the dynamic blockchain system 1100, as shown in FIG. 1, can similarly include a plurality of dynamic blockchain management servers 1102.

In an embodiment, as illustrated in FIG. 8, a dynamic blockchain method 800, can include:
a) Provisioning a dynamic blockchain system 802, wherein the dynamic blockchain system 1100 can include:
at least one complete asset node server 1112, which is configured to store complete versions of a digital asset, such as documents in their source format;
a plurality of hash asset node servers 1122, wherein each hash asset node server stores a copy of an asset blockchain, which includes cryptographic hashes of the digital assets for secure preservation and validation of the complete versions of the digital assets; and
a dynamic blockchain management server 1102, which receives and processes requests to add, update, and validate the complete versions of the digital assets;
b) Selecting a statistically representative number of hash asset node servers 804, by using a representation calculation function 1414 to calculate the statistically representative number of hash asset node servers in the plurality of hash asset node servers based on a function input of a total number of hash asset node servers;
c) Validating the digital asset 806, wherein the digital asset is validated by a random sampling in the statistically representative number of hash asset node servers 1122 in the plurality of hash asset node servers 1122; wherein the validation of the digital asset is successful if at least a predetermined minimum validation threshold of hash asset node servers 1122 in the statistically representative number of hash asset node servers 1122 validate the digital asset.

FIGS. 1-8 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 1-7D depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

FIG. 1 shows a depiction of an embodiment of the dynamic blockchain system 1100, including the at least one complete asset node server 1112, the plurality of hash asset node servers 1122, the dynamic blockchain management server 1102, and the dynamic blockchain management device 1104. In this relation, a server shall be understood to represent a general computing capability that can be physically manifested as one, two, or a plurality of individual physical computing devices, located at one or several physical locations. A server can for example be manifested as a shared computational use of one single desktop computer, a dedicated server, a cluster of rack-mounted physical servers, a datacenter, or network of datacenters, each such datacenter containing a plurality of physical servers, or a computing cloud, such as AMAZON EC2™ or MICROSOFT AZURE™.

It shall be understood that the above-mentioned components of the at least one complete asset node server 1112, the plurality of hash asset node servers 1122, the dynamic blockchain management server 1102, and the dynamic blockchain management device 1104 are to be interpreted in the most general manner.

For example, the processors 1202, 1302, 1402, 1502 can each respectively include a single physical microprocessor or microcontroller, a cluster of processors, a datacenter or a cluster of datacenters, a computing cloud service, and the like.

In a further example, the non-transitory memories 1204, 1304, 1404, 1504 can each respectively include various forms of non-transitory storage media, including random access memory and other forms of dynamic storage, and hard disks, hard disk clusters, cloud storage services, and other forms of long-term storage. Similarly, the input/outputs 1206, 1306, 1406, 1506 can each respectively include a plurality of well-known input/output devices, such as screens, keyboards, pointing devices, motion trackers, communication ports, and so forth.

Furthermore, it shall be understood that the at least one complete asset node server 1112, the plurality of hash asset node servers 1122, the dynamic blockchain management server 1102, and the dynamic blockchain management device 1104 can each respectively include a number of other components that are well known in the art of general computer devices, and therefore shall not be further described herein. This can include system access to common functions and hardware, such as for example via operating system layers such as WINDOWS™, LINUX™, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the dynamic blockchain management server 1102, communicates with the at least one complete asset node server 1112, the plurality of hash asset node servers 1122, and the dynamic blockchain management device 1104 over a network, which can be configured as a public or private cloud, which can include the general Internet, a Wide Area Network or a Local Area Network, or another form of communication network, transmitted on wired or wireless connections. Wireless networks can for example include Ethernet, Wi-Fi, BLUETOOTH™, ZIGBEE™, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the . . . device, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

For example, alternative embodiments can reconfigure or combine the components of the dynamic blockchain management server 1102 and the dynamic blockchain management device 1104. The components of the dynamic blockchain management server 1102 can be distributed over a plurality of physical, logical, or virtual servers. Parts or all of the components of the dynamic blockchain management device 1104 can be configured to operate in the dynamic blockchain management server 1102, whereby the dynamic blockchain management device 1104 for example can function as a thin client, performing only graphical user interface presentation and input/output functions. Alternatively, parts or all of the components of the dynamic blockchain management server 1102 can be configured to operate in the dynamic blockchain management device 1104.

Many such alternative configurations are readily apparent, and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A dynamic blockchain system, comprising:
   a) at least one complete asset node server, which is configured to store complete versions of a digital asset, wherein the at least one complete asset node server further comprises:
      a first processor;
      a first non-transitory memory;
      a first input/output component;
      a complete asset manager, which manages processing of the complete versions of the digital asset; and
      a complete asset storage, which stores a plurality of records comprising the complete versions of the digital asset; all connected via
      a first data bus;
   b) a plurality of hash asset node servers, wherein each hash asset node server stores a copy of an asset blockchain, which includes a hash of the digital asset for secure preservation and validation of the complete versions of the digital asset; and
   c) a dynamic blockchain management server, which is configured to receive and process requests to add, update, and validate the complete versions of the digital asset;
   wherein the dynamic blockchain management server is configured to perform an asset validation of the digital asset by lookup with a lookup asset identifier and a lookup version number to retrieve a corresponding version of the digital asset in the at least one complete asset node server, and by verification of the digital asset by a random sampling in a statistically representative number of hash asset node servers in the plurality of hash asset node servers, such that an asset block of the asset blockchain matches the lookup asset identifier, the lookup version number, and a cryptographic hash of the digital asset, for each hash asset node server in the statistically representative number of hash asset node servers;
   wherein the complete asset storage comprises a plurality of asset records, which each comprise:
      a first asset identifier;
      an asset type;
      a first version number;
      a first transaction number; and
      a complete asset object.

2. The dynamic blockchain system of claim 1, wherein the asset validation of the digital asset is successful if at least a minimum validation threshold of hash asset node servers in the statistically representative number of hash asset node servers validate the digital asset.

3. The dynamic blockchain system of claim 2, wherein the minimum validation threshold of hash asset node servers is a validation proportion threshold in a range of 50%-99%.

4. The dynamic blockchain system of claim 1, further comprising:
   a dynamic blockchain management device, which enables a user to interact with the dynamic blockchain management server.

5. The dynamic blockchain system of claim 1, further comprising:
   a plurality of dynamic blockchain management devices, which each enable a corresponding user to interact with the dynamic blockchain management server;
   wherein each dynamic blockchain management device in the plurality of dynamic blockchain management devices is associated with a corresponding hash asset node server in the plurality of hash asset node servers.

6. The dynamic blockchain system of claim 1, wherein the complete asset object further comprises a plurality of asset elements.

7. The dynamic blockchain system of claim 6, wherein each hash asset node server further comprises:
   a) a second processor;
   b) a second non-transitory memory;
   c) a second input/output component;
   d) the asset blockchain, comprising a linked structure of asset blocks, wherein each asset block comprises a hash representation of a version of the digital asset; and e) a hash asset manager, which manages processing of the asset blockchain; all connected via
f) a second data bus.

8. The dynamic blockchain system of claim 7, wherein each asset block in the linked structure of asset blocks comprises:
   a) a previous block hash;
   b) a time stamp;
   c) a second asset identifier;
   d) a second version number;
   e) a second transaction number; and
   f) an asset hash, which is a cryptographic hash of the complete asset object.

9. The dynamic blockchain system of claim 8, wherein the dynamic blockchain management server is configured to perform an asset validation of the digital asset by:
   lookup with a lookup asset identifier and a lookup version number to retrieve a corresponding version of the digital asset in the at least one complete asset node server, such that the lookup asset identifier matches the first asset identifier and the lookup version number matches the first version number; and
   by verification of the digital asset by a random sampling in a statistically representative number of hash asset node servers in the plurality of hash asset node servers, such that each asset block matches the lookup asset identifier, the lookup version number, and a cryptographic hash of the corresponding version of the digital asset, for each hash asset node server in the statistically representative number of hash asset node servers,
   such that the lookup asset identifier matches the second asset identifier, the lookup version number matches the second version number, and
   a calculated cryptographic hash of the corresponding version of the digital asset matches the asset hash.

10. The dynamic blockchain system of claim 8, wherein each asset block in the linked structure of asset blocks further comprises:
    a plurality of asset element hashes, which are cryptographic hashes of the plurality of asset elements.

11. The dynamic blockchain system of claim 8, wherein each asset block in the linked structure of asset blocks further comprises:
    a cryptographic proof.

12. The dynamic blockchain system of claim 11, wherein the cryptographic proof is selected from the group consisting of:
    a proof of work;
    a proof of stake; and
    a combination of these.

13. The dynamic blockchain system of claim 1, wherein the dynamic blockchain management server further comprises:
    a) a processor;
    b) a non-transitory memory;
    c) an input/output component;
    d) a blockchain manager; and
    e) an asset map, which is configured to allow lookup of corresponding complete asset node servers and corresponding hash asset node servers that correspond to the digital asset; all connected via
    f) a data bus.

14. The dynamic blockchain system of claim 13, wherein the asset map comprises a plurality of map records, which each comprise:
    a) a map asset identifier;
    b) a map version number;
    c) a map transaction number;
    d) a complete node identifier;
    e) a complete node internet address;
    f) a hash node identifier; and
    g) a hash node internet address.

15. The dynamic blockchain system of claim 14, wherein the complete node internet address and the hash node internet address are uniform resource locators.

16. The dynamic blockchain system of claim 14, wherein the at least one complete asset node server is located by lookup of the complete node identifier in the asset map, such that the lookup asset identifier matches the map asset identifier and the lookup version number matches the map version number; and
    wherein the statistically representative number of hash asset node servers are located by lookup of corresponding hash node identifiers in the asset map, such that the lookup asset identifier matches the map asset identifier and
    the lookup version number matches the map version number.

17. The dynamic blockchain system of claim 13, wherein the dynamic blockchain management server further comprises:
    a representation calculation function, for calculating the statistically representative number of hash asset node servers in the plurality of hash asset node servers based on a function input of a total number of the hash asset node servers in the plurality of hash asset node servers.

18. A dynamic blockchain method, comprising:
    provisioning a dynamic blockchain system, wherein the dynamic blockchain system comprises:
       at least one complete asset node server, which is configured to store complete versions of a digital asset, wherein the at least one complete asset node server further comprises:
          a first processor;
          a first non-transitory memory;
          a first input/output component;
          a complete asset manager, which manages processing of the complete versions of the digital asset; and
          a complete asset storage, which stores a plurality of records comprising the complete versions of the digital asset; all connected via
          a first data bus;
       a plurality of hash asset node servers, wherein each hash asset node server stores a copy of an asset blockchain, which includes cryptographic hashes of the digital asset for secure preservation and validation of the complete versions of the digital asset; and
       a dynamic blockchain management server, which receives and processes requests to add, update, and validate the complete versions of the digital assets; and
    selecting a statistically representative number of hash asset node servers, by using a representation calculation function to calculate the statistically representative number of hash asset node servers in the plurality of hash asset node servers based on a function input of a total number of hash asset node servers in the plurality of hash asset node servers;
    wherein the complete asset storage comprises a plurality of asset records, which each comprise:
       a first asset identifier;
       an asset type;
       a first version number;

a first transaction number; and a complete asset object.

19. The dynamic blockchain method of claim 18, further comprising:

validating the digital asset, wherein the digital asset is validated by a random sampling in the statistically representative number of hash asset node servers in the plurality of hash asset node servers, such that the validation of the digital asset is successful if at least a predetermined minimum validation threshold of hash asset node servers in the statistically representative number of hash asset node servers validate the digital asset.

20. A dynamic blockchain system, comprising:

a) at least one complete asset node server, which is configured to store complete versions of a digital asset;

b) a plurality of hash asset node servers, wherein each hash asset node server stores a copy of an asset blockchain, which includes a hash of the digital asset for secure preservation and validation of the complete versions of the digital asset; and c) a dynamic blockchain management server, which is configured to receive and process requests to add, update, and validate the complete versions of the digital asset;

wherein the dynamic blockchain management server is configured to perform an asset validation of the digital asset by lookup with a lookup asset identifier and a lookup version number to retrieve a corresponding version of the digital asset in the at least one complete asset node server, and by verification of the digital asset by a random sampling in a statistically representative number of hash asset node servers in the plurality of hash asset node servers, such that an asset block of the asset blockchain matches the lookup asset identifier, the lookup version number, and a cryptographic hash of the digital asset, for each hash asset node server in the statistically representative number of hash asset node servers;

wherein the dynamic blockchain management server further comprises:

a processor;

a non-transitory memory;

an input/output component;

an asset map, which is configured to allow lookup of corresponding complete asset node servers and corresponding hash asset node servers that correspond to the digital asset; all connected via a data bus;

wherein the asset map comprises a plurality of map records, which each comprise:

a map asset identifier;

a map version number;

a map transaction number;

a complete node identifier;

a complete node internet address;

a hash node identifier; and a hash node internet address.

* * * * *